United States Patent [19]

Beer et al.

[11] 4,379,776

[45] Apr. 12, 1983

[54] PROCESS FOR REDUCING ALUMINUM AND FLUORINE IN PHOSPHORIC ACIDS

[75] Inventors: Gary L. Beer, Huntington Beach; Elie Chemtob, Claremont, both of Calif.

[73] Assignee: Occidental Research Corporation, Irvine, Calif.

[21] Appl. No.: 282,465

[22] Filed: Jul. 13, 1981

[51] Int. Cl.$^3$ .......................................... C01B 25/16
[52] U.S. Cl. .............................. 423/321 R; 423/166; 423/320
[58] Field of Search ................ 423/321 R, 320, 321 S, 423/166, 167

[56] References Cited

U.S. PATENT DOCUMENTS 3,379,501  4/1968  Treitler et al. ................... 423/321 R
3,528,771  9/1970  Shearon et al. ...................... 423/166
3,792,151  2/1974  Case .................................... 423/320
4,299,804  11/1981  Parks .

FOREIGN PATENT DOCUMENTS 467843  6/1937  United Kingdom ............ 423/321 R

OTHER PUBLICATIONS

Gatilova et al., "Synthesis & Study of Aluminum Fluoride Phosphates," Jul. 1980, pp. 997-999.
White et al., New Zealand Journal of Science, "Calcination of Christmas Island Phosphates," Dec. 1971, vol. 14, pp. 971-992.
White et al., New Zealand Journal of Science, "Compounds Formed in the Manufacture of Superphosphates from the Phosphates of Christmas and Nauru Islands and Queensland", vol. 19, pp. 421-431.
Frazier et al., TVA, "Chemical Behavior of Fluorine in the Production of Wet-Process Phosphoric Acid," pp. 1-19.

*Primary Examiner*—O. R. Vertiz
*Assistant Examiner*—Gregory A. Heller
*Attorney, Agent, or Firm*—Barry A. Bisson

[57] ABSTRACT

Aluminum fluorophosphate can be produced by the aging of phosphoric acid containing fluorine and aluminum, preferably phosphoric acid analyzing in the range of about 15-45 weight percent $P_2O_5$, 2-4% $Al_2O_3$ and 1-2% fluorine. One process involves digestion of phosphate ore matrix in recycled phosphoric acid, filtration of the insoluble residue, precipitation and filtration of gypsum, and aging of the product acid to precipitate the aluminum impurity as an aluminum fluorophosphate compound. The aluminum fluorophosphate can be decomposed (as by heating at about 195° C.) to produce HF and aluminum phosphate.

5 Claims, 1 Drawing Figure

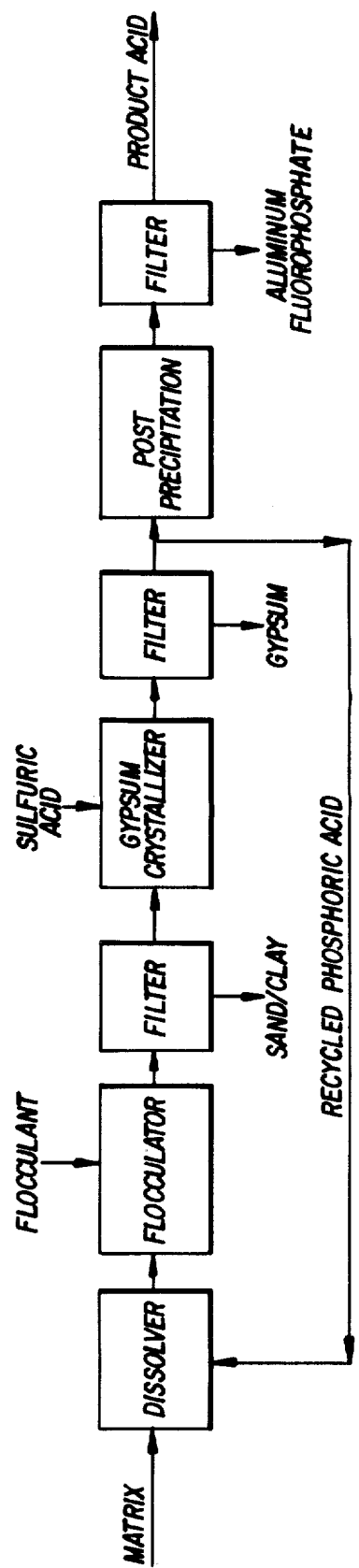

PROCESS FOR REDUCING ALUMINUM AND FLUORINE IN PHOSPHORIC ACIDS

BACKGROUND OF THE INVENTION

The invention involves a method for removing aluminum and/or fluorine from impure phosphoric acids.

Other aspects of the present invention are processes for producing a novel layered aluminum fluorophosphate of composition $AlFHPO_4.2H_2O$ which is hydroscopic and can be readily decomposed to recover hydrogen fluoride and produce a solid aluminum phosphate which can be used as a fertilizer, or converted to sodium phosphates, etc.

The present invention also involves a means of converting high alumina content phosphate matrix into a relatively low aluminum content phosphoric acid without the usual beneficiation by floatation. This process permits conversion to phosphoric acid (and aluminum phosphate) of a much greater proportion of the phosphate values in the matrix. For example, in the usual beneficiation of phosphate matrix, by the dihydrate or hemihydrate routes, only about fifty percent of the phosphate values in the matrix are recovered in the beneficiated product. In contrast, about eighty percent of the phosphate values in the matrix can be recovered by the present process.

Phosphate reserves are sedimentary deposits formed by reprecipitation of dissolved phosphate from prehistoric seas. For example, a typical North Florida phosphate ore consists primarily of fluorapatite (a phosphate-containing mineral), quartz sand, and clay minerals. This ore body is called the phosphate matrix.

In current mining practice, the matrix is excavated by draglines, slurried with water at high pressure (e.g. about 200 pounds per square inch) and pumped through miles of pipeline to the beneficiation plants where sand and clays are removed from the fluorapatite by floatation processes, producing the so-called beneficiated phosphate rock.

Current commercial processes call for the usage of either beneficiated or high quality phosphate rock and sulfuric acid as raw materials to produce either hemihydrate or dihydrate phosphoric acid. In most cases where beneficiation operations are required, losses of about 40% $P_2O_5$ values in the matrix occur in the form of slimes and tailings. The slimes are discharged to storage ponds as a dilute slurry containing about 5% of fine particulate minerals, which take years to settle. For every acre-ft of matrix mined, about 1.5 acre-ft of slime is produced as a result of beneficiation. Accordingly, rock beneficiation creates an environmental concern in addition to the large loss of $P_2O_5$ values.

In U.S. Pat. No. 3,792,151 to Case, phosphoric acid is produced from low BPL (bone phosphate of lime or tricalcium phosphate) phosphate rock having about 1.5% fluorine by a process comprising reacting the phosphate rock with an equilibrated phosphoric acid having a $P_2O_5$ concentration between about 20 to 50% in an attack stage at a temperature below about 180° F., said equilibrated acid being essentially saturated with respect to the fluorine component of said rock at the temperature of said attack stage; said temperature and the time of reaction serving to dissolve at least about 90 percent of the tricalcium phosphate in the rock to produce a monocalcium phosphate-phosphoric acid-water solution up to about 90 percent saturated with monocalcium phosphate and containing insoluble material and a soluble fluorine content of from about 1 to 3 percent, the weight ratio of $P_2O_5$ in the acid to $P_2O_5$ in the rock feed being sufficient to dissolve tricalcium phosphate values in the rock and provide the desired solution and at least about 7:1, separating the insoluble material from the solution to produce a solution of monocalcium phosphate-phosphoric acid-water, said solution having a fluorine content of from 1 to 3 percent, reacting sulfuric acid with said solution to produce phosphoric acid and precipitate calcium sulfate, the sulfuric acid being added in an amount essentially stoichiometric with respect to the monocalcium phosphate in the solution, separating the calcium sulfate from the phosphoric acid solution, removing a portion of the phosphoric acid as product, and recycling the remaining phosphoric acid solution to the attack stage to provide said equilibrated acid and removing a portion of the phosphoric acid as product. There is no disclosure in the Case patent of a process for removing alumina from the product acid by forming an aluminum fluorophosphate. Furthermore, the phosphoric acid produced by the process of this invention is not an equilibrated $P_2O_5$ because of the removal of the aluminum and fluorine in the precipitation of the aluminum fluorophosphate. In one embodiment of the commonly owned application of Ore', filed on the same day as this application and which is hereby incorporated herein, this low aluminum and low fluorine content phosphoric acid product is used to dissolve the tricalcium phosphate in the matrix; thereby controlling the fluoride content of the crystallization (of calcium sulfate) step such that the aluminum fluorophosphate does not form until after the gypsum separation. The Ore' application also involves controlling the fluoride content by other means, such as volatilization and addition of sodium or potassium compounds.

In the manufacture of synthetic cryolite, an aluminum fluoro phosphate $AlF_2H_2PO_4$ is reported in U.S. Pat. No. 3,672,189 to Betts. This composition is different from that produced in the present process, in that it is relatively higher in HF than in the novel $AlFHPO_4$ of the present invention. Also, the production of the Betts compound would not lower the aluminum content of phosphoric acid to as great an extent as does the production of $AlFHPO_4.2H_2O$ as disclosed hereinafter. The process steps involved in the manufacture of synthetic cryolite are quite different from the process for manufacture of the novel aluminum fluorophosphate of the present invention.

Aluminum fluorophosphate of composition $Al(HPO_4)F.2H_2O$ is reported in the July 1980 Russian Journal of Inorganic Chemistry 25(7) 1980; however, this compound is reported as being formed by a process involving adding aluminum sulphate solution to a mixture of phosphoric acid and ammonium fluoride. The reagents used were "pure" or "highly pure" grades. No work is reported in the Russian Journal article of a process whereby $AlFHPO_4.2H_2O$ is prepared from impure phosphoric acid (e.g., green or black acid or from a high alumina content phosphoric acid produced from unbeneficiated matrix).

J. W. Akitt, N. N. Greenwood, and G. D. Lester, "Nuclear Magnetic Resonance and Raman Studies of the Aluminum Complexes formed in Aqueous Solutions of Aluminum Salts Containing Phosphoric Acid and Fluoride Ions," J. Chemical Society (A), 1971, mention the existence in a liquid phase of the complex $AlF_2H_2PO_4$.

Herein percentages are by weight unless otherwise specified.

SUMMARY OF THE INVENTION

The invention relates to a novel compound $AlFH-PO_4 \cdot 2H_2O$. The compound can be prepared by saturating a fluoride-containing phosphoric acid with respect to aluminum, for example, by dissolving $Al_2O_3$ in hot 15–45% $P_2O_5$ analysis phosphoric acid, which contains fluoride as an impurity. When the aluminum saturated phosphoric acid is cooled or aged, a solid precipitate of aluminum fluorophosphate forms, and can be separated by filtration, settling, centrifuging etc. The resulting phosphoric acid liquid has a low content of aluminum and is low in fluorine. Accordingly, the process for manufacture of aluminum fluorophosphate could be used in connection with any phosphoric acid process, which produces a high aluminum content phosphoric acid or a high fluorine content phosphoric acid. The process could also be useful for removing fluorine and aluminum from dihydrate and hemihydrate black acids produced in Florida or for removing fluorine from phosphoric acid produced by the "kiln" process such as these of U.S. Pat. Nos. 3,235,330 and 3,241,914 or of copending application Ser. U.S. Pat. Nos. 365,305, 365,306, and 365,307 (all filed May 20, 1981).

The aluminum fluorophosphate solid is useful in the production of hydrofluoric acid and aluminum phosphate (the aluminum phosphate can be used as an intermediate in the production of soluble phosphates, fertilizers or animal feed supplements) because it is readily defluorinated without forming a glass melt at high temperatures. It can also be converted to valuable sodium or potassium phosphates by reaction with sodium or potassium compounds (e.g., $Na_2CO_3$) as by addition to the calcine feed or by reaction with the aluminum phosphate product of the calcination.

The aluminum fluorophosphate can be produced by the aging of any aqueous phosphoric acid containing sufficient fluorine and aluminum and analyzing no more than about 45% $P_2O_5$, but preferably from an acid analyzing at least 1% F and 2% $Al_2O_3$, typically in the range of about 15–45 weight percent $P_2O_5$, 2–4% $Al_2O_3$ and 1–2% fluorine. However, it has been discovered that in continuously producing phosphoric acid from unbeneficiated, high aluminum phosphate matrix, the steady-state phosphoric acid produced during the reaction of sulfate with dissolved monocalcium phosphate, can have such a high content of fluorine and/or aluminum as to cause premature coprecipitation of an aluminum fluorophosphate with the solid calcium sulfate.

In one embodiment, the process involves digestion of phosphate ore matrix in recycled phosphoric acid, filtration of the insoluble residue, precipitation and filtration of gypsum by addition of a sulfate (e.g., sulfuric acid), and aging of the product acid to precipitate the aluminum impurity as an aluminum fluorophosphate compound. In the invention of Ore the controlled removal of fluorine is preferably effected by adding a compound of sodium or potassium or both (e.g., sulfates, carbonates, hydroxides, nitrates, silicates, etc.) to the reaction mixture to which sulfuric acid or other sulfate is added. Less preferred is removal of fluorine by volatilization (as of $SiF_4$).

Recovery of phosphate values from the matrix into the product acid can be greater than 80%, conventional processes only recover approximately 50% of the phosphate in the matrix, the major loss of 40% being suffered during the rock beneficiation process.

The aluminum fluorophosphate can be decomposed (as by heating at about 195° C. or higher) to produce HF and aluminum phosphate. Relatively pure phosphate salts, as of sodium, potassium, etc. can be made by reaction of the appropriate reagent with the aluminum phosphate or with the calcine feed mixture.

The invention can involve a process for removing aluminum and fluorine from impure aqueous phosphoric acid analyzing, in weight percent, no more than about 45% $P_2O_5$, in the range of about 2 to about 4% $Al_2O_3$ and about 1 to about 2% F, said process comprising:

(a) aging said impure aqueous phosphoric acid at an elevated temperature for sufficient time to permit the formation of a solid precipitate comprising an aluminum fluorophosphate; and, (b) separating said solid precipitate from the aged phosphoric acid.

The impure aqueous phosphoric acid can be obtained by (i) dissolution of a high alumina-content phosphate rock in aqueous phosphoric acid to produce a solution comprising monocalcium phosphate and (ii) adding sulfate ions to said solution comprising monocalcium phosphate to produce said impure aqueous phosphoric acid. The high alumina content phosphate rock can comprise unbeneficiated phosphate ore matrix, high alumina pebble or any of the high alumina content phosphate rocks of the U.S.

One embodiment of the present invention involves a direct route to phosphoric acid from phosphate matrix, sometimes hereinafter called "the matrix process", this process is the invention of Fernando Ore.

The matrix process consists of three steps:
1. Dissolution of phosphate values, and separation of insoluble solids preferably a flocculant, e.g., a polyacrylamide is added to aid the separation.
2. Precipitation and separation of calcium sulfate; and
3. Separation of soluble metallic impurities, especially aluminum, to produce commercial quality acid (as by extraction or precipitation, as in U.S. Pat. Nos. 4,243,637; 4,082,836 and 4,243,643).

Some of the matrix process advantages are:
Improved recovery of $P_2O_5$ values from the matrix body, e.g., from about 52% wet process phosphoric acid production to as high as about 82% by the matrix process Eliminating of the rock beneficiation plant and process Reduction or elimination of slime ponds and consequent environmental problems Recovery of byproducts such as uranium, aluminum, and fluorine The invention permits processing of lower grade ore which cannot economically be processed by present technology. This is of particular interest due to the declining quality of phosphate reserves world-wide.

The invention can involve a so-called "matrix" process for producing phosphoric acid from unbeneficiated phosphate ore matrix, said process comprising:

(a) digesting said phosphate ore matrix in aqueous impure phosphoric acid containing as impurities dissolved ions of aluminum and fluorine, to produce undissolved solids and a solution comprising ions of calcium, phosphate, fluorine and aluminum;

(b) separating said undissolved solids from said solution comprising ions of calcium, phosphate, fluorine and aluminum;

(c) adding sufficient sulfuric acid to said solution comprising ions of calcium, phosphate, fluorine and aluminum to cause the precipitation of substantially all of said ions of calcium as solid gypsum and producing an impure aqueous phosphoric acid solution containing ions of aluminum and fluorine, (d) separating said solid gypsum from said impure aqueous phosphoric acid containing ions of aluminum and fluorine, to produce a low solids content impure aqueous phosphoric acid;

(e) aging said low solids content impure aqueous phosphoric acid to cause formation of a solid precipitate comprising an aluminum fluorophosphate in an aqueous solution comprising phosphoric acid and;

(f) separating said solid precipitate from said aqueous solution comprising phosphoric acid to obtain a phosphoric acid product.

In the matrix process a portion of the low solids content impure aqueous phosphoric acid can be used in the digestion of step (a).

fine solids, which creates a considerable environmental problem. In addition, there has been a steady decline in the quality of phosphate rock produced, as the producers follow the standard procedure of mining the highest quality rock available.

For these reasons, it is desirable to have a process to utilize raw, unbeneficiated phosphate matrix directly as feed for wet process phosphoric acid production.

Characterization of Matrix Feed Composition

Samples of matrix from north Florida were received and analyzed to illustrate the matrix quality and ranges of impurities that would be encountered in a commercial process.

Analyses of numerous matrix samples is reported in Table 1 to illustrate ranges of various compositional variables such as suspended solids, moisture content and the limits of the major impurities aluminum, iron, magnesium and fluoride.

TABLE 1

| | COMPOSITIONS OF VARIOUS MATRIX SAMPLES (WT. %) | | | | | | | | |
|---|---|---|---|---|---|---|---|---|---|
| | 'E' MATRIX | 'K' MATRIX | #146 | #148 | #151 | #147 | #149 | #150 | BENEFICIATED ROCK |
| $P_2O_5$ | 13.8 | 9.9 | 11.9 | 12.1 | 11.6 | 15.6 | 17.8 | 14.6 | 32.7 |
| Suspended Solid | — | — | 22 | 15 | 14 | 80 | 62 | 82 | — |
| Moisture Content | (Dry) | (Dry) | 15 | 14 | 16 | 18 | 16 | 19 | (Dry) |
| Ratios × 100 | | | | | | | | | |
| $Al_2O_3:P_2O_5$ | 10.3 | 24.2 | 25.2 | 25.6 | 25.9 | 27.6 | 24.2 | 26.7 | 4.4 |
| $MgO:P_2O_5$ | 4.1 | 0.4 | 2.4 | 2.2 | 2.2 | 4.0 | 3.3 | 4.7 | 1.0 |
| $Fe_2O_3:P_2O_5$ | 8.7 | 1.8 | 7.4 | 7.1 | 7.7 | 11.3 | 11.7 | 16.0 | 1.9 |
| $CaO:P_2O_5$ | 1.43 | 1.42 | 1.61 | 1.50 | 1.59 | 1.51 | 1.54 | 1.55 | 1.51 |
| $F:P_2O_5$ | 9.4 | 4.1 | 15.3 | 10.9 | 13.5 | 15.8 | 13.1 | 15.8 | 11.8 |

THE DRAWINGS

The accompanying FIG. 1 illustrates a preferred embodiment of the invention wherein unbeneficiated phosphate matrix is digested with recycled phosphoric acid (leaving a residue of undissolved solids), a flocculant (e.g., a polyacrylomide) is added to aid the separation of the solids. The solids (comprising sand and clay) are separated to produce a solution comprising monocalcium phosphate and impurities.

Sulfuric acid is added to the monocalcium phosphate to precipitate calcium sulfate (e.g., gypsum) and to produce phosphoric acid. The solid calcium sulfate is separated (as by filtration) to produce phosphoric acid. Part of the phosphoric acid (typically, the strong wash stage of the filtration) is recycled to the dissolver to digest more matrix while the remainder is preferably passed to the post precipitation stage where it is aged to form a solid aluminum fluorosilicate, which is separated by filtration.

FURTHER DESCRIPTION

Most current commercial processes for the production of wet process phosphoric acid involve reacting beneficiated phosphate rock (essentially the calcium phosphate mineral apatite) with sulfuric acid to produce the crude acid and calcium sulfate (either dihydrate or hemihydrate). However, during the flotation beneficiation of the rock, as much as 30–40% of the phosphate values are discarded, and a fine solids slurry, called slimes, is produced. These slimes require impoundment for several years to allow settling and dewatering of the Some polyacrylamide flocculants for the separation of dissolution residue can be effective at 100 ppm by weight of reaction mixture dosage levels, 1,000 ppm is usual for other flocculants. The preferred flocculants include Sanflor AH-70P, a slightly anionic polyacrylamide produced by Sanyo Industries of Japan.

Production of good quality gypsum in the crystallization step can be achieved at short residence time (about 15 minutes) for high alumina matrix acid at about 75° C., and about 3% sulfate level.

Aluminum fluorophosphate (AFP) precipitation from hot phosphoric acid (e.g., about 28% $P_2O_5$) can be used for aluminum removal. The precipitation behaves as a classical system with first order kinetics.

AFP has shown the potential of being an excellent source of high purity HF and sodium phosphates, thus offering the possibility of by-products recovery revenue from a waste material.

It was discovered that aluminum can be precipitated from hot phosphoric acid solutions (e.g., 28% $P_2O_5$) as a salt identified as an aluminum fluorophosphate hydrate having the following composition:

$P_2O_5 = 40-42\%$
$Al_2O_3 = 30-32\%$
$F = 10-11\%$
$H_2O = 18-20\%$

Dihydrate acid, after the aluminum precipitation in the right conditions, could be made to contain as low as 1% $Al_2O_3$. The major operation involved is to age the high aluminum acid for around 3 hours at 80°–90° C. Some iron is also coprecipitation in the aluminum precipitation, but only as a minor constituent.

The block diagram of FIG. 1 illustrates one matrix phosphoric acid process. The recycled phosphoric acid digested the matrix in the dissolver. Flocculant addition facilitated the separation of undigested solids, such as sand and clay, from the liquid acid through a filtration stage. Sulfuric acid was added to the crystallizer for gypsum formation. Product acid became readily available after the gypsum filtration. However, when a high level of aluminum exists in the matrix the product acid can exceed acceptable commercial specifications for aluminum content.

Accordingly, the process of FIG. 1 incorporates a postprecipitation stage and a filtration stage for formation and separation of aluminum fluorophosphate from the product acid. This lowers the aluminum and fluorine contents of the product phosphoric acid.

If the phosphate matrix is relatively low in aluminum phosphates, the digestion is preferably done at a low temperature to reduce solubilization of aluminum compounds in the rock. This is the invention of Eli Chemtob.

| CONDITIONS OF FORMATION OF FAlHPO$_4$.2H$_2$O (sometimes hereinafter "Falphite") | | | |
|---|---|---|---|
| A. | Components in solution | Minimum | Maximum |
| | P$_2$O$_5$ | 5% | 50% |
| | Al$_2$O$_3$ | 2% | *saturated |
| | F | 1% | no maximum |

*The saturation of Al$_2$O$_3$ in phosphoric acid solution varies with the concentration of P$_2$O$_5$ and F and also with temperature. The phase diagram of the system P$_2$O$_5$—Al$_2$O$_3$—HF—H$_2$O is not yet fully established. The saturation of acids in P$_2$O$_5$ in the presence of HF at 80° C. is around 4% (with 28% P$_2$O$_5$).

B. Temperature and Residence Time

With the components conditions cited above, Falphite starts to form after a residence time of 2-3 hours at temperatures above 60° C. and the precipitation is complete in about 1-2 hours to after nucleation. Nucleation can be induced by seeding. The nucleation time decreases with temp., as well as the total precipitation time. But passes by a maximum at 80° C.

If the solution is seeded with falphite from a previous run, the nucleation time is greatly reduced (e.g. about ½ hour).

The nucleation time is also inversely proportional to the concentration of P$_2$O$_5$ in the acid and the quantity of falphite formed is also bigger at low P$_2$O$_5$ concentrations, when all other variables are constant.

At low temperatures, Falphite is formed much more slowly, even with seeding. As an example a solution containing 28% P$_2$O$_5$, 4% Al$_2$O$_3$ and 2% F behaves as follows.

| Aging Temperature (°C.) | Starting of Falphite Formation |
|---|---|
| 25 | 5 days |
| 40 | 30 days |
| 55 | 6 hours |

A possible structure of falphite is

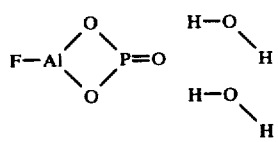

although this has not yet been rigorously proven; therefore, the compound is perhaps more precisely termed a "fluoroaluminum phosphate".

TABLE 2

PHOSPHORIC ACID AT VARIOUS P$_2$O$_5$ CONCENTRATIONS CONTAINING 3.8% Al$_2$O$_3$ and 2% F
In all the experiments, the acid was heated to 80° C. 0.05 g of falphite from a previous experiment were added as a seeding as soon as the temperature reached 80° C. and the mixture was stirred at this temp. for 6 hours.
The same weight of 32 g was taken in all experiments.

| P$_2$O$_5$ in Starting Acid, % | Filtrate | | | Precipitate | | | |
|---|---|---|---|---|---|---|---|
| | P$_2$O$_5$ | Al$_2$O$_3$ | F | Weight | P$_2$O$_5$ | Al$_2$O$_3$ | F |
| 55 | Not Done | | | No Precipitate | | | |
| 50 | Not Done | | | Very Faint Precipitate (Negligible) | | | |
| 45 | 42.9 | 2.80 | 1.68 | 3.6 | 41.1 | 30.3 | 9.48 |
| 40 | 39.0 | 1.88 | 1.24 | 7.7 | 40.5 | 29.6 | 9.30 |
| 35 | 31.9 | 1.22 | 1.00 | 10.0 | 38.1 | 27.2 | 9.17 |
| 30* | 26.8 | 1.08 | 1.18 | 9.5 | 38.5 | 27.8 | 9.16 |
| 27** | 23.55 | 0.65 | 0.23 | 11.5 | 39.3 | 28.6 | 9.48 |
| 25 | 20.5 | 0.65 | 1.00 | 10.85 | 38.4 | 27.2 | 9.04 |
| 20 | 16.2 | 0.60 | 0.84 | 11.9 | 36.5 | 27.1 | 8.88 |

NOTE:
The weights of the precipitate represent grams per 100 grams of starting acid.
*This experiment's residence time was only 3 hours.
**This experiment was done at an earlier time, first with 30 g of acid, then with the addition of 15 gm of acid containing 3.8% Al$_2$O$_3$ but no fluorine. Therefore actual total F was 1.33%

HEAT DECOMPOSITION OF FALPHITE

The attached Table 3 gives the loss on ignition as well as the quantity of fluorine remaining in the sample at each stage of the heating.

TABLE 3

| | | HEAT DECOMPOSITION OF FALPHITE | | |
|---|---|---|---|---|
| | | | F | |
| T °C. | Loss on Heating | % in heated product (as is) | % in heated product (reported to 100 g of original) | Ratio v/original |
| 70 | original | | | |
| 100 | 10.2 | — | — | — |
| 120 | 15.4 | 10.2 | 8.9 | 100 |
| 140 | 16.8 | — | — | — |
| 160 | 21.2 | 11.3 | 8.9 | 100 |
| 180 | 26.3 | 10.2 | 7.52 | 84 |
| 200 | 35.1 | 2.06 | 1.34 | 15 |
| 220 | 36.3 | 1.34 | 0.85 | 9.5 |
| 240 | 36.6 | 0.85 | 0.54 | 6.1 |
| 260 | 36.9 | 0.79 | 0.50 | 5.6 |
| 340 | 37.0 | 0.29 | 0.18 | 2.1 |
| 410 | 37.1 | 0.15 | 0.094 | 1.1 |
| 480 | 37.1 | 0.05 | 0.031 | 0.35 |

The aluminum content can be reduced in a solution of phosphoric acid containing from about 5 to about 45% P$_2$O$_5$ and about 1 to about 4% Al$_2$O$_3$ and about 1 to about 2% F (as HF or free fluoride ion) by aging this solution for a period from about 1 hour to about 7 days at temperatures between about 25° C. and the boiling temperature of the solution. The precipitate, when dried at 100° C. has the following formula AlPO$_4$.HF.2H$_2$O or (AlF)$^{++}$(HPO$_4$)$^=$.2H$_2$O. This composition is substantially constant and substantially independent of the temperature, residence time, and the initial concentration of P$_2$O$_5$, Al, F.

When the phosphoric acid solution contains other elements or radicals such as SO$_4$, Fe$_2$O$_3$, CaO, MgO, the Falphite precipitate is substantially free from all these impurities except Fe$_2$O$_3$. The quantity of Fe$_2$O$_3$ in the precipitate is almost constant, about 2% with no regard to the quantity of iron in the original phosphoric acid solution.

The formation of this precipitate provides an easy method to deplete the aluminum from a high aluminum content wet process phosphoric acid and also to deplete the fluorine from a high fluorine wet phosphoric acid solution.

Falphite also has the important property of decomposing at temperatures above about 160° C. to about 500° C. to evolve HF and $H_2O$ leaving a residue of aluminum phosphate (which may contain some iron from the wet process phosphoric acid). This is an improved process for producing HF and the aluminum and phosphate value of the calcined residue can also be recovered.

This invention includes the use of falphite formation to separate the aluminum in a phosphoric acid solution and the production of HF by thermal decomposition of falphite.

Removal of Aluminum From Wet Phosphoric Acid

When Unbeneficiated phosphate matrix is used to produce phosphoric acid the content of aluminum can be so high as to make the product acid unacceptable for most commercial uses.

Many ways have been studied to remove the aluminum or to try to prevent its dissolution from the matrix. Some phosphate ores respond very well to the latter technique when the aluminum is not tied to the $P_2O_5$ values. It is very difficult however to prevent the dissolution of aluminum in the recycled acid if the aluminum values are tied to $P_2O_5$.

Aluminum in wet phosphoric acid can be removed by precipitation of an aluminum-magnesium-fluoride complex called "ralstonite". This compound has been chiefly used rather for the precipitation of magnesium in a high magnesium acid (e.g., see U.S. Pat. No. 4,243,643) and this precipitation is currently performed in practice successfully when the ratio of magnesium to aluminum in the acid is sufficiently high to separate magnesium while leaving a substantial amount of aluminum in the liquid phase. When aluminum is the desired element to be removed from a high aluminum acid, the ratio of magnesium to aluminum is usually so small that the precipitated aluminum would be insignificant compared to the bulk of existing aluminum. The present invention provides an improved method of removing aluminum from a high aluminum phosphoric acid. For example, the aluminum can be brought down from about 4% to around 1% in the acid after precipitation. The precipitated $P_2O_5$ values in the Falphite need not be lost because they can be later recovered, as can the fluorine and aluminum values.

Production HF By Heat Decomposition

When the aluminum fluo-phosphate $FAlHPO_4.2H_2O$ is heated the following reactions take place:

From room temperature to about 160° C. water only is evolved.

From 160° C. to about 500° C. HF is evolved, 1st very rapidly between about 180° C. to about 220° C. and then very slowly to about 500° C. where substantially all the fluorine is expelled. The residue at this temperature has still the same physical shape at the original aluminum fluo-phosphate i.e. no observable melting or clinker formation. The HF-free residue is aluminum orthophosphate, $AlPO_4$.

This provides an improved process for producing HF, with or without $H_2O$ according to the temperature chosen. The HF can be swept with air or an inert gas and collected.

The decomposition can also be done under reduced pressure.

ILLUSTRATIVE EXAMPLES

EXAMPLE 1

A continuous laboratory matrix dissolution unit was operated for 63 hours (on an 8-hour per day, 5-day week basis). It was put on standby over night and weekends. While on standby, the acid temperature was held at about 60°–70° C.

The dissolution reactor operated satisfactorily at approximately +1.2%-free sulfate level. At these conditions both matrix dissolution and gypsum crystallization occurred simultaneously. This shows that the process could operate using a single reactor system.

The aluminum level in the recycled matrix acid increased linearly from 0.6% to 2.3% $Al_2O_3$. At this point, overnight storage at about 80° C. produced a substantial amount of aluminum fluorophosphate precipitate, lowering the aluminum in the acid to 1.4% (39% reduction).

The iron level of the acid during the run increased from 0.9% to 1.3% $Fe_2O_3/P_2O_5$ ratio. The sandy-type matrix used as feed had a relatively low $Fe_2O_3/P_2O_5$ ratio.

The average filtration rate of the undigested matrix solids and gypsum during the run was calculated to be 0.24 TPD $P_2O_5$ per square foot of filter area without the use of flocculants. This should improve with flocculants and/or heated wash liquors.

The solid-liquid separation step for the aluminum fluorophosphate needs considerably more work due to its gelatinous nature and slow filtration rate, such as the use of additives to change the nature of the precipitate and slurry properties.

A study was made of the effect of $P_2O_5$ concentration on the aluminum precipitation (fixed aluminum and fluorine levels) in the usual range expected for the matrix process acid. The experiments were at 80° C. and six hours after seeding with preformed precipitate. The results are summarized as follows:

- The precipitate has a constant composition independent of $P_2O_5$ concentration corresponding to the stoichiometry for $AlFHPO_4.2H_2O$.
- The precipitate forms best at lower $P_2O_5$ concentrations. It does not form at all above about 45% $P_2O_5$.
- The best conditions appear to be about 25% $P_2O_5$, about 2–4% $Al_2O_3$ and about 1–2% F, which are easily reached in the matrix process by control of the digestion rate and recycle of impure acid from the gypsum filter.

Due to the relative ease of fluorine removal by precipitation and the potential for recovery of HF from the aluminum precipitate, it is best to operate the decomposition under conditions where the water of hydration is removed separately from the HF, thus simplifying the recovery of HF in anhydrous form.

EXAMPLE 2

The discovery of the new compound $FAlHPO_4.2H_2O$ was an unexpected result of experiments, the purpose of which were to find how much aluminum that a wet dihydrate process "black" phosphoric acid (produced by the Occidental Chemical Company in north Florida) could tolerate. $Al_2O_3$ has its maximum solubility at 80° C. The Florida dihydrate acid was chosen because it is similar to the acid produced by the matrix process of Example 1, particularly with regards to the $P_2O_5$ concentration. The analysis of this acid in weight % follows:

$P_2O_5 = 26.75$
$F = 2.00$
$SO_4 = 1.47$
$SiO_2 = 0$
$Fe_2O_3 = 0.86$
$Al_2O_3 = 3.47$
$CaO = 0.15$
$Mg = 0.25$

The acid was heated at 80° C. (this is a typical temperature of the product matrix acid, as from Example 1) and small quantities of pure aluminum hydroxide, $Al(OH)_3$, were added slowly until complete dissolution. After a while (and many additions of $Al(OH)_3$) the solution did not become completely clear after the last addition, even after 15 minutes. The solution was left for a longer residence time to try and clarify the solution, and suddenly after 3 hours residence time at 80° C. a massive precipitate appeared. That kept increasing in quantity making the slurry so viscous that the stirrers stopped rotating. The slurry was filtered and the filtered acid analyzed. The residue on the filter was not washed but analyzed as is the analysis of the filtrate was.

$P_2O_5 = 26.1$
$Fe_2O_3 = 0.87$
$Al_2O_3 = 1.65$
$F = 1.35$
$CaO = 0.11$
$MgO = 0.25$
$SiO_2 = 0.27$

An extrapolated analysis of the solid phase (by removing the entrainment by using the calcium as a tracer) gave the following analysis of the solid.

$P_2O_5 = 41.05$
$Fe_2O_3 = 1.27$
$Al_2O_3 = 24.75$
$F = 9.85$

The surprising discovery came when the values for aluminum in the aluminum doped acid were compared with the filtered acid separated from the precipitate. The filtered acid had 1.6% aluminum, a reduction from the original 3.7%.

In the light of this 1st experiment a study began immediately to ascertain the nature and the composition of the precipitate by using reagent grade materials with only 3 components: $P_2O_5$, $Al_2O_3$, FH. This study and others provide one basis for the conclusions presented in this application.

What is claimed is:

1. A process for removing aluminum and fluorine from impure aqueous wet process phosphoric acid analyzing, in weight percent, no more than about 45% $P_2O_5$, in the range of about 2 to about 4% $Al_2O_3$ and about 1 to about 2% F, said process comprising:
    (a) aging said impure aqueous phosphoric acid at an elevated temperature of between 60°-80° C. for sufficient time to permit the formation of solid precipitate comprising an aluminum fluorophosphate of $AlFHPO_4.2H_2O$; and,
    (b) separating said solid precipitate from the aged phosphoric acid.

2. A process according to claim 1 wherein said impure aqueous phosphoric acid is obtained by (i) dissolution of a high alumina-content phosphate rock in aqueous phosphoric acid to produce a solution comprising monocalcium phosphate and (ii) adding sulfate ions to said solution comprising monocalcium phosphate to produce said impure aqueous phosphoric acid.

3. The process of claim 2 wherein said high alumina content phosphate rock comprises unbeneficiated phosphate ore matrix.

4. A process for producing phosphoric acid from unbeneficiated phosphate one matrix containing clay, silica and phosphate, said process comprising:
    (a) digesting said phosphate one matrix in aqueous impure phosphoric acid containing as impurities dissolved ions of aluminum and fluorine, to produce undissolved solids and a solution comprising ions of calcium, phosphate, fluorine and aluminum;
    (b) separating said undissolved solids from said solution comprising ions of calcium, phosphate, fluorine and aluminum;
    (c) adding sufficient sulfuric acid to said solution comprising ions of calcium, phosphate, fluorine and aluminum to cause the precipitation of substantially all of said ions of calcium as solid gypsum and producing an impure aqueous phosphoric acid solution containing ions of aluminum and fluorine,
    (d) separating said solid gypsum from said impure aqueous phosphoric acid containing ions of aluminum and fluorine, to produce a low solids content impure aqueous phosphoric acid;
    (e) aging said low solids content impure aqueous phosphoric acid at an elevated temperature of between 60°-80° C. to cause formation of a solid precipitate comprising an aluminum fluorophosphate $AlFHPO_4.2H_2O$ in an aqueous solution comprising phosphoric acid and;
    (f) separating said solid precipitate from said aqueous solution comprising phosphoric acid to obtain a phosphoric acid product.

5. The process of claim 4 wherein a portion of said low solids content impure aqueous phosphoric acid is used in the digestion of step (a).

* * * * *